(12) United States Patent
Fukuoka et al.

(10) Patent No.: US 9,287,821 B2
(45) Date of Patent: Mar. 15, 2016

(54) DC ELECTRIC MOTOR CONTROL DEVICE

(71) Applicants: Takayuki Fukuoka, Aichi (JP); Yoshiki Yamagishi, Aichi (JP); Satoshi Kido, Aichi (JP); Yasutaka Shirota, Aichi (JP)

(72) Inventors: Takayuki Fukuoka, Aichi (JP); Yoshiki Yamagishi, Aichi (JP); Satoshi Kido, Aichi (JP); Yasutaka Shirota, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 219 days.

(21) Appl. No.: 13/763,158

(22) Filed: Feb. 8, 2013

(65) Prior Publication Data
US 2013/0207576 A1    Aug. 15, 2013

(30) Foreign Application Priority Data

Feb. 8, 2012  (JP) ................................. 2012-024682

(51) Int. Cl.
| | |
|---|---|
| *H02P 31/00* | (2006.01) |
| *H02P 29/02* | (2006.01) |
| *H02P 7/00* | (2006.01) |
| *E05F 15/40* | (2015.01) |
| *E05F 15/63* | (2015.01) |
| *E05F 15/70* | (2015.01) |

(52) U.S. Cl.
CPC ............... *H02P 31/00* (2013.01); *E05F 15/40* (2015.01); *E05F 15/63* (2015.01); *E05F 15/70* (2015.01); *H02P 7/0044* (2013.01); *H02P 29/021* (2013.01); *E05Y 2400/32* (2013.01); *E05Y 2400/50* (2013.01); *E05Y 2900/546* (2013.01)

(58) Field of Classification Search
CPC ...... H02P 31/00; H02P 29/021; H02P 7/0044
USPC .................................................. 318/280, 283
See application file for complete search history.

(56) References Cited

U.S. PATENT DOCUMENTS

| | | | |
|---|---|---|---|
| 4,686,598 | A | 8/1987 | Herr |
| 7,218,120 | B2 | 5/2007 | Shimoyama et al. |
| 2003/0041847 | A1* | 3/2003 | Shin .............................. 123/631 |

(Continued)

FOREIGN PATENT DOCUMENTS

| | | |
|---|---|---|
| DE | 3346366 A1 | 7/1985 |
| JP | 8091239 A | 4/1996 |

(Continued)

OTHER PUBLICATIONS

Patent Abstracts of Japan, Publication No. 08091239, Publication Date: Apr. 9, 1996 (1 Page).

(Continued)

*Primary Examiner* — Kawing Chan
(74) *Attorney, Agent, or Firm* — Osha Liang LLP

(57) ABSTRACT

A DC electric motor control device has a motor driving circuit that is constructed by a plurality of switching elements, a controller that operates the motor driving circuit to control a normal rotation or a reverse rotation of a DC electric motor, and an abnormality determination part that determines whether an abnormality is generated while the controller controls the DC electric motor. The controller previously performs reverse rotation control of the DC electric motor for a predetermined time using the motor driving circuit when performing normal rotation control of the DC electric motor, and the controller performs the normal rotation control only when the abnormality determination part determines that the abnormality is not generated during the reverse rotation control.

11 Claims, 13 Drawing Sheets

(56) References Cited

U.S. PATENT DOCUMENTS

| | | | |
|---|---|---|---|
| 2003/0226704 A1* | 12/2003 | Aoki et al. | 180/271 |
| 2005/0218904 A1* | 10/2005 | Shimoyama et al. | 324/522 |
| 2007/0095131 A1 | 5/2007 | Takayama | |
| 2007/0194621 A1* | 8/2007 | Ishizuka | 303/122.12 |
| 2009/0284205 A1 | 11/2009 | Yamamoto | |

FOREIGN PATENT DOCUMENTS

| | | |
|---|---|---|
| JP | H0891239 A | 4/1996 |
| JP | 2002-220973 A | 8/2002 |
| JP | 2005318791 A | 11/2005 |
| JP | 2007-127034 A | 5/2007 |
| JP | 2008-148412 A | 6/2008 |
| JP | 2009-278729 A | 11/2009 |

OTHER PUBLICATIONS

Office Action issued in corresponding German Application No. 102013002245.2, mailed on Feb. 4, 2015 (7 pages).

Notification of Reasons for Refusal issued in Japanese Application No. 2012-024682, mailed on Dec. 2, 2014 (7 pages).

* cited by examiner

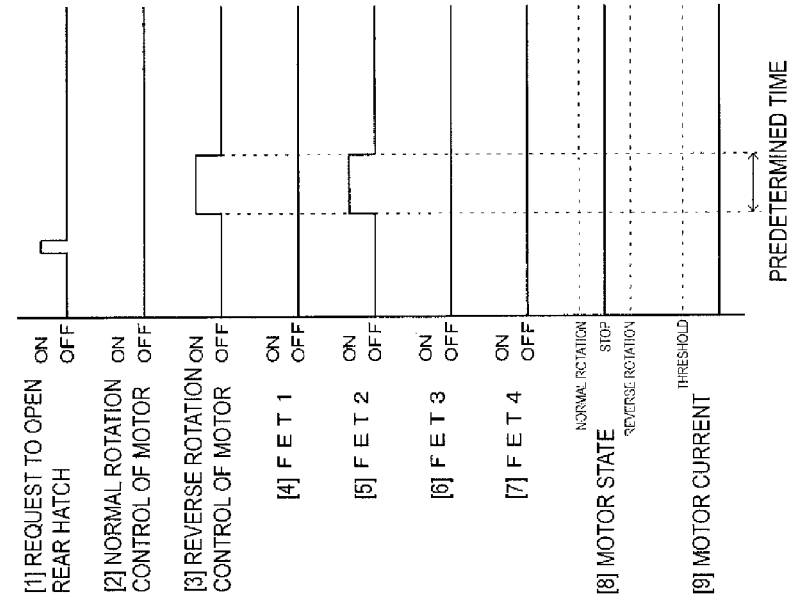
FIG. 4A  NORMAL ROTATION OF MOTOR (NORMAL TIME)
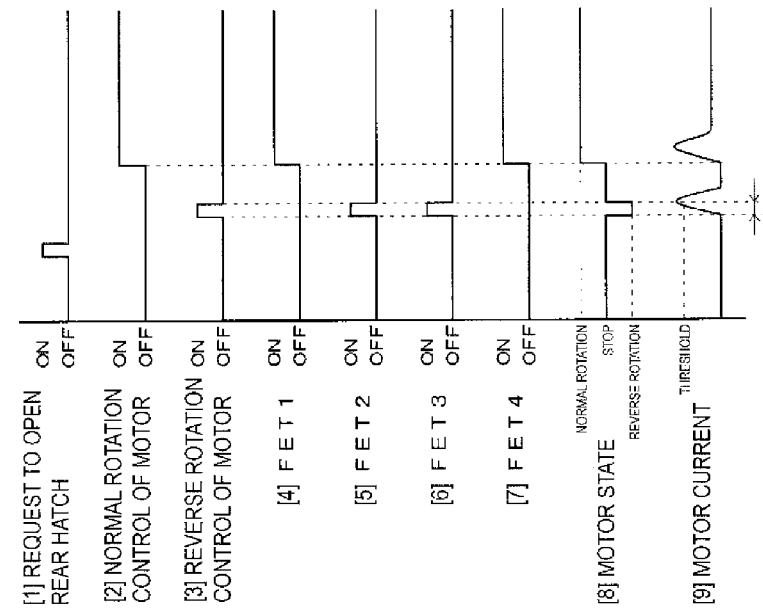
FIG. 4B  NORMAL ROTATION OF MOTOR (ABNORMAL TIME, FOR EXAMPLE, OFF BREAKDOWN OF FET 3)

FIG. 6A  REVERSE ROTATION OF MOTOR (NORMAL TIME)

FIG. 6B  REVERSE ROTATION OF MOTOR (ABNORMAL TIME, FOR EXAMPLE, OFF BREAKDOWN OF FET 4)

DC ELECTRIC MOTOR CONTROL DEVICE

BACKGROUND OF THE INVENTION

1. Technical Field

The present invention relates to a DC electric motor control device that controls drive of a DC electric motor for actuating an object.

2. Related Art

For example, Japanese Unexamined Patent Publication Nos. 8-91239 and 2005-318791 disclose DC electric motor control devices that control the drive of the DC electric motor.

In the control device disclosed in Japanese Unexamined Patent Publication No. 8-91239, a motor driving circuit constructed by four FETs is driven to control a normal rotation or a reverse rotation of the DC electric motor, thereby assisting a steering force of a steering wheel of a vehicle. When turn-on of an ignition key is detected, breakdown of a motor current detector is determined based on a current passed through the DC electric motor, which is detected by the motor current detector, and a current that is predicted in applying a voltage to the DC electric motor for a predetermined time.

In the control device disclosed in Japanese Unexamined Patent Publication No. 2005-318791, a motor driving circuit constructed by two relays and a FET is driven to control the normal rotation or the reverse rotation of the DC electric motor, thereby actuating an opening and closing body of the vehicle. In the case that drive control of the DC electric motor is stopped in a period during which the drive current is not passed through the DC electric motor, a test micro current is passed between the DC electric motor and the relay to turn on and off the relay, and the breakdown of the DC electric motor, the FET, or the relay is determined based on a detection result of the voltage between the relay and the FET.

In the opening and closing bodies, such as a rear hatch and a slide door of the vehicle, it is necessary to instantaneously switch the opening and closing bodies to an opening operation for the purpose of safety when a person or an object is caught in the opening and closing bodies during a closing operation. In the case that the opening and closing bodies fall freely in a closing direction due to the breakdown while the opening and closing bodies are being opened, it is necessary to close the opening and closing bodies against a gravitational force. Therefore, it is advantageous to securely reversely rotate the rotating direction of the DC electric motor while the DC electric motor is being driven.

SUMMARY

One or more embodiments of the present invention provides a DC electric motor control device that can prevent the drive in the abnormal state in which the DC electric motor is not reversely rotated.

In accordance with one or more embodiments of the present invention, an DC electric motor control device includes a motor driving circuit that is constructed by plural switching elements; a controller that operates the motor driving circuit to control a normal rotation or a reverse rotation of a DC electric motor; and an abnormality determination part that determines whether an abnormality is generated while the controller controls the DC electric motor. The controller previously performs reverse rotation control of the DC electric motor for a predetermined time using the motor driving circuit when performing normal rotation control of the DC electric motor, and the controller performs the normal rotation control only when the abnormality determination part determines that the abnormality is not generated during the reverse rotation control. The controller previously performs the normal rotation control of the DC electric motor for a predetermined time using the motor driving circuit when performing the reverse rotation control of the DC electric motor, and the controller performs the reverse control only when the abnormality determination part determines that the abnormality is not generated during the normal rotation control.

Accordingly, before the normal rotation or the reverse rotation of the DC electric motor is controlled, the reverse rotation control of the DC electric motor is performed only for the predetermined time in the opposite rotating direction to the intended direction, and whether the abnormality is generated is determined. The DC electric motor is driven in the intended rotating direction only when the abnormality is not generated. The DC electric motor is not driven in the intended rotating direction when the abnormality is generated in the reverse rotation control of the DC electric motor. Therefore, the drive in the abnormal state in which the DC electric motor is not reversely rotated can be prevented.

The DC electric motor control device further includes a rotation angle detector that detects a rotation angle of the DC electric motor, wherein the controller may perform the normal rotation control or the reverse rotation control of the DC electric motor in a range of a predetermined rotation angle based on a detection value of the rotation angle detector, and the controller may previously perform the control (reverse rotation control) of the DC electric motor for the predetermined time and the abnormality determination of the abnormality determination part when the DC electric motor is located at an angle of a normal rotation end or a reverse rotation end.

The DC electric motor control device further includes a position detector that detects a position of an object vertically moved by power of the DC electric motor, wherein the controller may perform the normal rotation control or the reverse rotation control to lift or lower the object in a predetermined range based on a detection value of the position detector, and the controller may previously perform the control (reverse rotation control) of the DC electric motor for the predetermined time and the abnormality determination of the abnormality determination part when the object is located at an upper end.

The DC electric motor control device further includes a position detector that detects a position of an object vertically moved by power of the DC electric motor, wherein the controller may perform the normal rotation control or the reverse rotation control to lift or lower the object in a predetermined range based on a detection value of the position detector, and the controller may previously perform the control (reverse rotation control) of the DC electric motor for the predetermined time and the abnormality determination of the abnormality determination part when the object is located at a lower end.

The DC electric motor control device further includes a current detector that detects a current passed through the DC electric motor, wherein the abnormality determination part may determine whether the abnormality is generated based on the current detected by the current detector.

In the DC electric motor control device, when the current detected by the current detector is greater than a threshold while the DC electric motor is previously controlled for the predetermined time (reverse rotation control), the abnormality determination part may determine that the abnormality is not generated, and the controller may stop the control (reverse rotation control) of the DC electric motor.

In the DC electric motor control, when the current detected by the current detector is greater than a threshold while the DC electric motor is previously controlled for the predetermined time (reverse rotation control), the abnormality determination part may determine that the abnormality is not generated after the predetermined time elapses, and the controller stops the control (reverse rotation control) of the DC electric motor.

According to one or more embodiments of the present invention, the DC electric motor control device that can prevent the drive in the abnormal state in which the DC electric motor is not reversely rotated can be provided.

BRIEF DESCRIPTION OF THE DRAWINGS

FIGS. 4A and 4B are timing charts of the rear hatch opening operation in the first embodiment;

DETAILED DESCRIPTION

Figure 1:
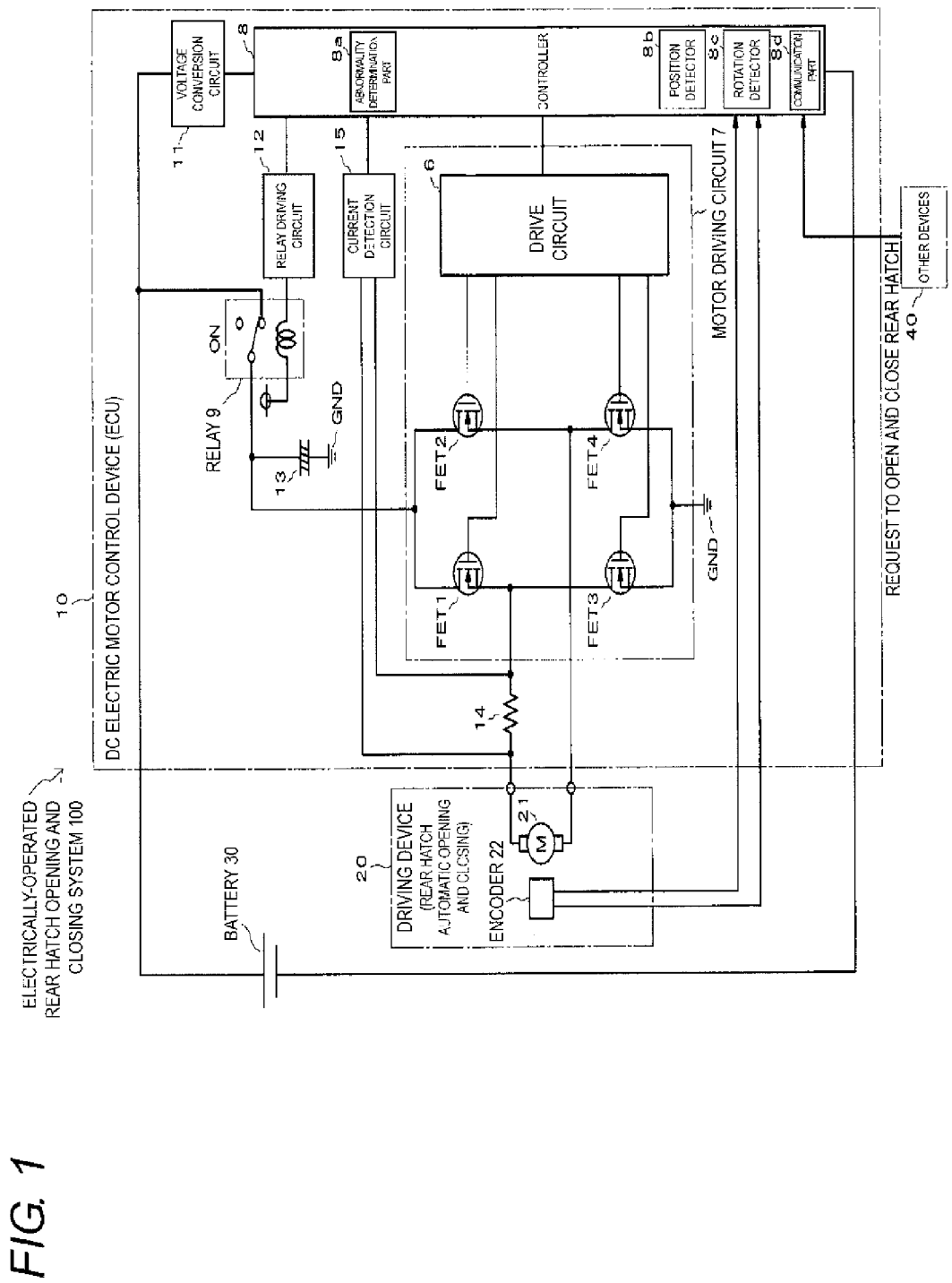
FIG. 1 is a configuration diagram illustrating an example of a DC electric motor control device according to one or more embodiments of the present invention.

Hereinafter, embodiments of the invention will be described with reference to the drawings. In the drawings, the identical or equivalent component is designated by the identical numeral. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

FIG. 1 is a view illustrating a configuration of a DC electric motor control device 10 according to one or more embodiments of the present invention. The DC electric motor control device 10 is an ECU (Electronic Control Device) that is used in an electrically-operated rear hatch opening and closing system 100 of an automobile.

Figure 2A:
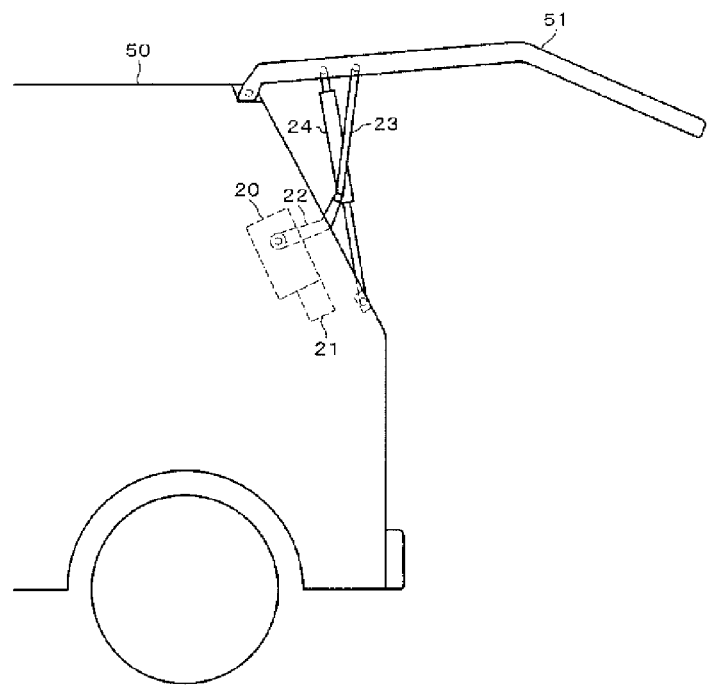
FIGS. 2A and 2B are views illustrating a rear hatch of a vehicle.
Figure 2B:
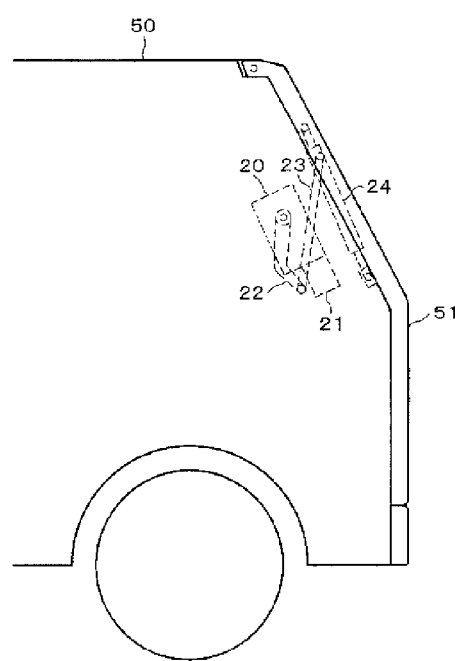

For example, as illustrated in FIGS. 2A and 2B, a driving device 20 vertically operates a rear hatch 51 of an automobile 50 by power of a DC electric motor 21. Particularly, the DC electric motor 21 rotates normally to transmit the power to an arm 22 through a reduction mechanism (not illustrated), and the arm 22 turns in one direction. Therefore, a rod 23 is pushed out to upwardly open the rear hatch 51. FIG. 2A illustrates a fully-opened state of the rear hatch 51, namely, a state in which the rear hatch 51 is located at an upper end.

The DC electric motor 21 rotates reversely to transmit the power to the arm 22 through the reduction mechanism, and the arm 22 turns in the other direction. Therefore, the rod 23 is pulled in to close the rear hatch 51 downwardly. FIG. 2B illustrates a fully-closed state of the rear hatch 51, namely, a state in which the rear hatch 51 is located at a lower end. A damper 24 suppresses the sudden opening and closing of the rear hatch 51. The rear hatch 51 is an example of the "object" according to one or more embodiments of the present invention.

As illustrated in FIG. 1, a two-phase encoder 22 is provided in the driving device 20. The two-phase encoder 22 outputs a pulse signal according to the normal rotation state and the reverse rotation state of the DC electric motor 21.

The controller 8 is constructed by a microcomputer. The controller 8 includes an abnormality determination part 8a, a position detector 8b, a rotation detector 8c, and a communication part 8d. The controller 8 is connected to a positive electrode of a battery 30 through a voltage conversion circuit 11. The controller 8 is connected to a negative electrode of the battery 30. The voltage conversion circuit 11 converts a voltage at the battery 30 into a voltage for the controller 8.

One end of a contact of a reverse connection protective relay 9 is connected to the positive electrode of the battery 30. The other end of the contact of the relay 9 is connected to a smoothing capacitor 13 and a motor driving circuit 7. One end of a coil of the relay 9 is connected to the battery 30 through a line different from that of the contact of the relay 9. The other end of the coil of the relay 9 is connected to a relay driving circuit 12.

The controller 8 energizes the coil of the relay 9 using the relay driving circuit 12, and turns on the contact of the relay 9 to supply a current from the battery 30 to the motor driving circuit 7. The controller 8 stops the energization of the coil of the relay 9 using the relay driving circuit 12, and turns off the contact of the relay 9 to cut off the current from the battery 30 to the motor driving circuit 7.

The motor driving circuit 7 includes an H-bridge circuit including four FETs (Field Effect Transistors) 1 to 4 and a drive circuit 6. The drive circuit 6 switches on-off of each of the FETs 1 to 4. FETs 1 to 4 are examples of the "switching element" according to one or more embodiments of the present invention.

The drive circuit 6 turns on the FETs 1 and 4 and turns off the FETs 2 and 3, whereby the current is passed through the DC electric motor 21 in a forward direction to normally rotate the DC electric motor 21. The drive circuit 6 turns off the FETs 1 and 4 and turns on the FETs 2 and 3, whereby the current is passed through the DC electric motor 21 in a reverse direction to reversely rotate the DC electric motor 21. The controller 8 operates the motor driving circuit 7 to control the normal rotation or the reverse rotation of the DC electric motor 21.

A resistor 14 is provided on a current-carrying line from the motor driving circuit 7 to the DC electric motor 21. A current detection circuit 15 is connected in parallel with the resistor 14. The current detection circuit 15 detects the current passed through the DC electric motor 21 by a voltage drop at both ends of the resistor 14. The current detection circuit 15 is an example of the "current detector" according to one or more embodiments of the present invention.

The abnormality determination part 8a of the controller 8 determines whether an abnormality is generated based on the current detected by the current detection circuit 15 during the control of the DC electric motor 21.

The rotation detector 8c of the controller 8 detects a rotation angle or the number of rotations in the normal and reverse directions of the DC electric motor 21 based on the pulse signal output from the encoder 22. The controller 8 controls the normal rotation or the reverse rotation over a predetermined rotation angle of the DC electric motor 21 based on the detection value of the rotation detector 8c. The rotation detector 8c is an example of the "rotation angle detector" according to one or more embodiments of the present invention.

The position detector 8b of the controller 8 detects an opening and closing position of the rear hatch 51 based on the rotation angle of the DC electric motor 21, which is detected by the rotation detector 8c. Based on the detection value of the position detector 8b, the controller 8 controls the normal rotation or the reverse rotation of the DC electric motor 21 to lift or lower the rear hatch 51 in a predetermined range.

Based on the detection values of the rotation detector 8c and the position detector 8b, the controller 8 operates the motor driving circuit 7 to control the number of rotations of the DC electric motor 21, thereby adjusting an opening and closing speed of the rear hatch 51.

The communication part 8d of the controller 8 receives a signal indicating a request to open and close the rear hatch 51 from other devices 40 such as a switch unit and an ECU which are provided in the vehicle.

Operations of the DC electric motor control device 10 in first to fourth embodiments will be described below.

Figure 3:
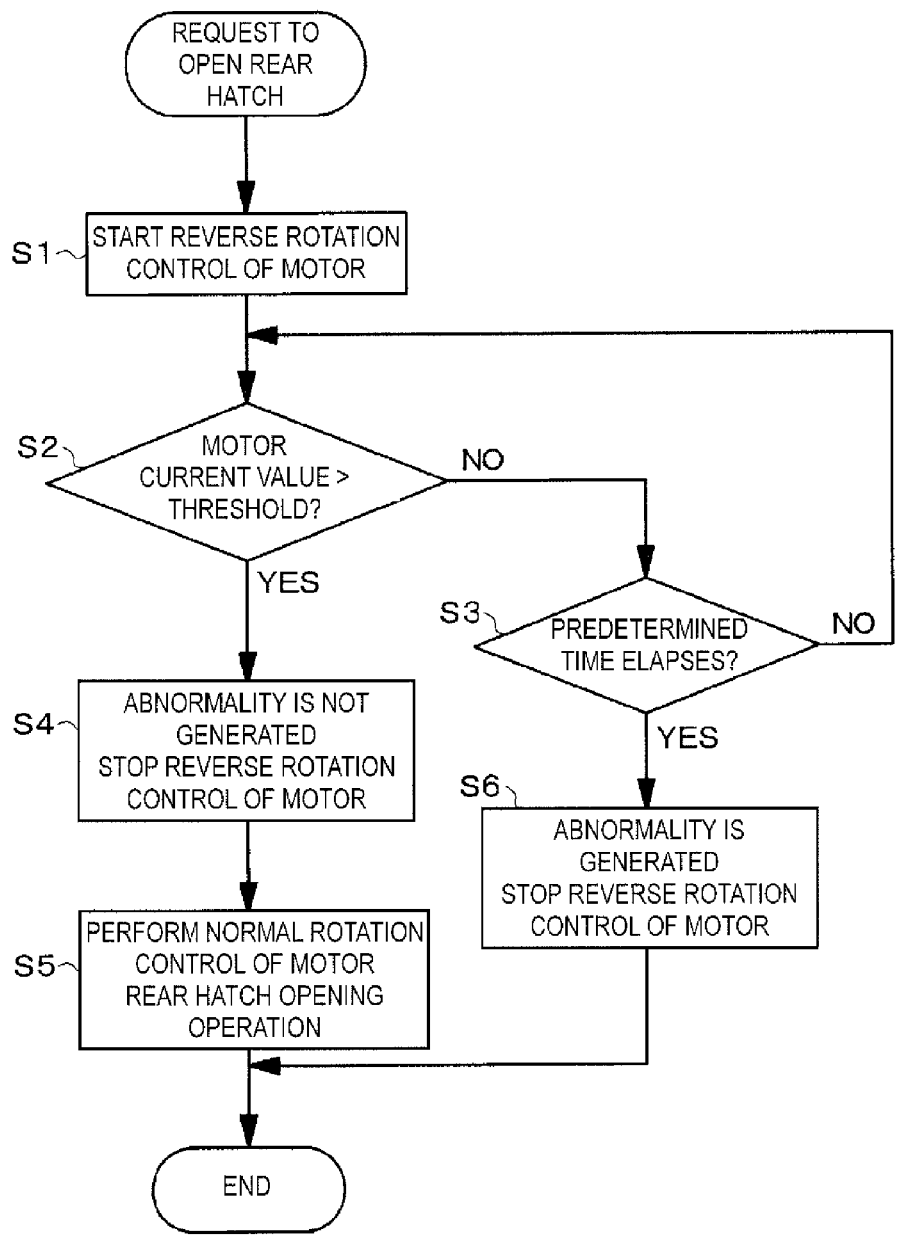
FIG. 3 is a flowchart of a rear hatch opening operation in a first embodiment.

FIG. 3 is a flowchart illustrating the opening operation of the rear hatch 51 in a first embodiment. FIGS. 4A and 4B are timing charts illustrating the opening operation of the rear hatch 51 in the first embodiment.

When receiving the request to open the rear hatch 51 from other devices 40 (ON of a circled number 1 in FIGS. 4A and 4B), the controller 8 starts reverse rotation control of the DC electric motor 21 using the motor driving circuit 7 (Step S1 in FIG. 3 and ON of a circled number 3 in FIGS. 4A and 4B) before the controller 8 controls the DC electric motor 21 in the opening operation direction of the rear hatch 51 (normal rotation control).

At this point, during the normal state, as illustrated in FIG. 4A, the FETs 1 and 4 of the motor driving circuit 7 are turned off (circled numbers 4 and 7), and the FETs 2 and 3 are turned on (circled numbers 5 and 6), whereby the DC electric motor 21 rotates reversely (a circled number 8). The current of the DC electric motor 21, which is detected by the current detection circuit 15, increases (a circled number 9).

When the current of the DC electric motor 21 is greater than a predetermined threshold (YES in Step S2 in FIG. 3 and the circled number 9 in FIG. 4A) while a predetermined time elapses (NO in Step S3 in FIG. 3), the abnormality determination part 8a determines that an abnormality is not generated, and the controller 8 stops the reverse rotation control of the DC electric motor 21 (Step S4 in FIG. 3 and OFF of the circled number 3 in FIG. 4A). Therefore, the FETs 1 to 4 of the motor driving circuit 7 are turned off (the circled numbers 4 to 7), and the DC electric motor 21 stops (the circled number 8 in FIG. 4A).

Then the controller 8 performs the normal rotation control of the DC electric motor 21 using the motor driving circuit 7 to open the rear hatch 51 (Step S5 in FIG. 3). Therefore, during the normal state, as illustrated in FIG. 4A, the FETs 1 and 4 of the motor driving circuit 7 are turned on (the circled numbers 4 and 7), and the FETs 2 and 3 are turned off (the circled numbers 5 and 6), whereby the DC electric motor 21 rotates normally (the circled number 8) to lift the rear hatch 51.

On the other hand, for example, during an abnormal state due to generation of such breakdown that the FET 3 of the motor driving circuit 7 remains off (hereinafter referred to as "OFF breakdown"), as illustrated in FIG. 4B, when the controller 8 starts the reverse rotation control of the DC electric motor 21 (the circled number 3), the FETs 1 and 4 are turned off (the circled numbers 4 and 7), and the FET 2 is turned on (the circled number 5) while the FET 3 is not turned on (the circled number 6). Therefore, the DC electric motor 21 remains stopped (the circled number 8), but the current of the DC electric motor 21, which is detected by the current detection circuit 15, does not increase (the circled number 9).

When the predetermined time elapses (YES in Step S3 in FIG. 3) while the current of the DC electric motor 21 is less than or equal to the threshold (NO in Step S2 in FIG. 3), the abnormality determination part 8a determines that the abnormality is generated, and the controller 8 stops the reverse rotation control of the DC electric motor 21 (Step S6 in FIG. 3 and OFF of the circled number 3 in FIG. 4B). Therefore, the FETs 1 to 4 of the motor driving circuit 7 are turned off (the circled numbers 4 to 7 in FIG. 4B). Then the controller 8 does not perform the normal rotation control of the DC electric motor 21 using the motor driving circuit 7 and not open the rear hatch 51 (go to "END" in FIG. 3).

Figure 5:
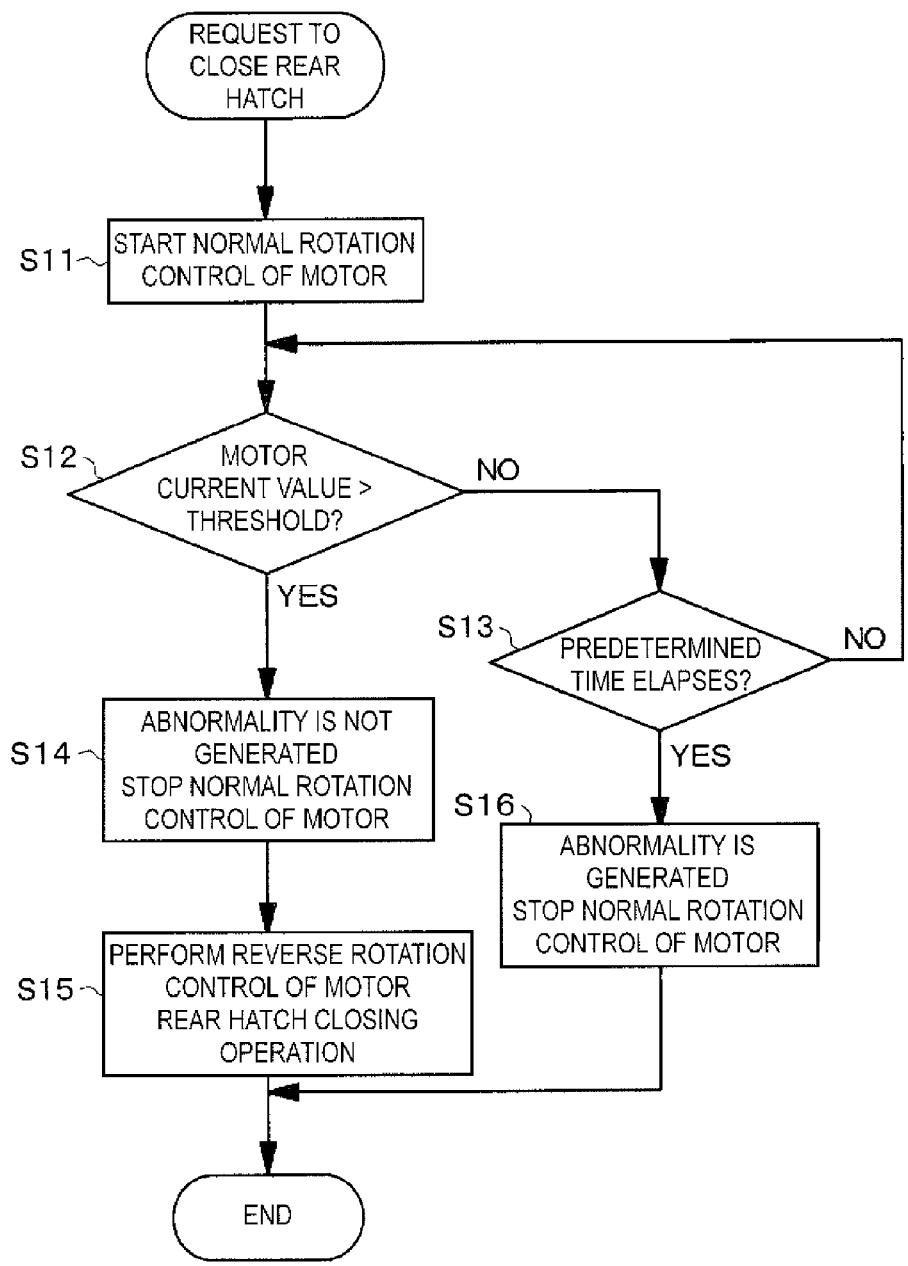
FIG. 5 is a flowchart of a rear hatch closing operation in the first embodiment.
Figure 6:
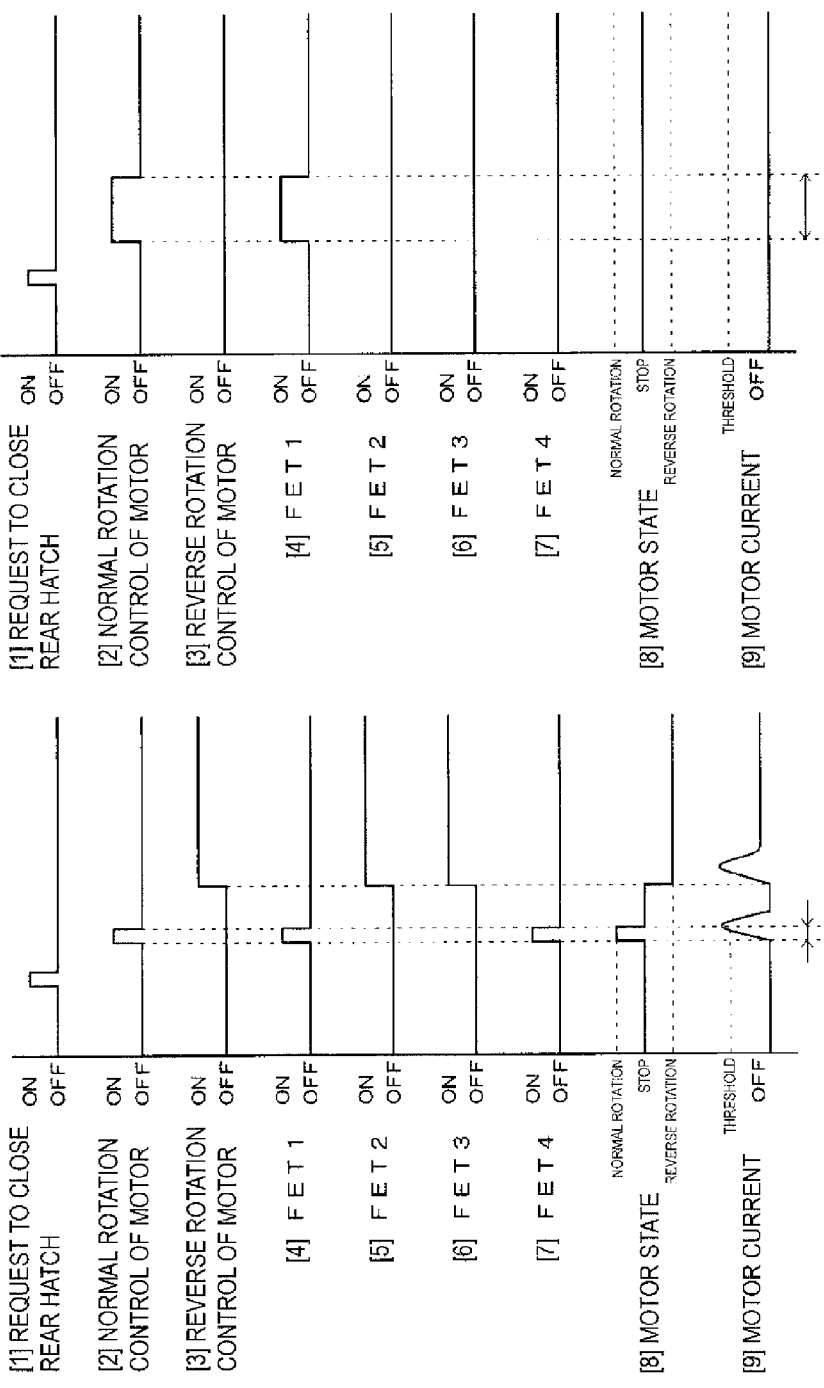
FIGS. 6A and 6B are timing charts of the rear hatch closing operation in the first embodiment.

FIG. 5 is a flowchart illustrating the closing operation of the rear hatch 51 in the first embodiment. FIGS. 6A and 6B are timing charts illustrating the closing operation of the rear hatch 51 in the first embodiment.

When receiving the request to close the rear hatch 51 from other devices 40 (ON of the circled number 1 in FIGS. 6A and 6B), the controller 8 starts the normal rotation control of the DC electric motor 21 using the motor driving circuit 7 (Step S11 in FIG. 5 and ON of a circled number 2 in FIGS. 6A and 6B) before the controller 8 controls the DC electric motor 21 in the closing operation direction of the rear hatch 51 (the reverse rotation control).

At this point, during the normal state, as illustrated in FIG. 6A, the FETs 1 and 4 of the motor driving circuit 7 are turned on (the circled numbers 4 and 7), and the FETs 2 and 3 are turned off (the circled numbers 5 and 6), whereby the DC electric motor 21 rotates normally (the circled number 8). The current of the DC electric motor 21 increases (the circled number 9).

When the current of the DC electric motor 21 is greater than a predetermined threshold (YES in Step S12 in FIG. 5 and the circled number 9 in FIG. 6A) while a predetermined time elapses (NO in Step S13 in FIG. 5), the abnormality determination part 8a determines that an abnormality is not generated, and the controller 8 stops the normal rotation control of the DC electric motor 21 (Step S14 in FIG. 5 and OFF of the circled number 2 in FIG. 6A). Therefore, as illustrated in FIG. 6A, the FETs 1 to 4 of the motor driving circuit 7 are turned off (the circled numbers 4 to 7), and the DC electric motor 21 stops (the circled number 8).

Then the controller 8 performs the reverse rotation control of the DC electric motor 21 using the motor driving circuit 7 to close the rear hatch 51 (Step S15 in FIG. 5). Therefore, as illustrated in FIG. 6A, the FETs 1 and 4 of the motor driving circuit 7 are turned off (the circled numbers 4 and 7), and the FETs 2 and 3 are turned on (the circled numbers 5 and 6), whereby the DC electric motor 21 rotates reversely (the circled number 8) to lower the rear hatch 51.

On the other hand, for example, during the abnormal state in which the OFF breakdown is generated in the FET 4 of the motor driving circuit 7, as illustrated in FIG. 6B, when the controller 8 starts the normal rotation control of the DC electric motor 21 (the circled number 2), the FETs 2 and 3 are turned off (the circled numbers 5 and 6), and the FET 1 is turned on (the circled number 4) while the FET 4 is not turned on (the circled number 7). Therefore, the DC electric motor 21 remains stopped (the circled number 8), but the current of the DC electric motor 21, which is detected by the current detection circuit 15, does not increase (the circled number 9).

When the predetermined time elapses (YES in Step S13 in FIG. 5) while the current of the DC electric motor 21 is less than or equal to the threshold (NO in Step S12 in FIG. 5), the abnormality determination part 8a determines that the abnormality is generated, and the controller 8 stops the normal rotation control of the DC electric motor 21 (Step S16 in FIG. 5 and OFF of the circled number 2 in FIG. 6B). Therefore, the FETs 1 to 4 of the motor driving circuit 7 are turned off (the circled numbers 4 to 7 in FIG. 6B). Then the controller 8 does not perform the reverse rotation control of the DC electric motor 21 using the motor driving circuit 7 and not close the rear hatch 51 (go to "END" in FIG. 5).

According to the first embodiment, in the case that the controller 8 controls the drive of the normal rotation or reverse rotation of the DC electric motor 21 in response to the request to open or close the rear hatch 51, the controller 8 previously performs the reverse rotation control of the DC electric motor 21 in the opposite rotation direction to the intended direction for the predetermined time using the motor driving circuit 7, and the abnormality determination part 8a determines whether the abnormality is generated. The DC electric motor 21 is driven in the intended rotating direction when the abnormality is not generated, but the DC electric motor 21 is not driven in the intended rotating direction when the abnormality is generated. Therefore, the drive in the abnormal state in which the DC electric motor 21 is not reversely rotated can be prevented.

In the first embodiment, at a time point when the current of the DC electric motor 21 is greater than the threshold while the reverse rotation control of the DC electric motor 21 is performed during the previous predetermined time, the abnormality determination part 8a determines that the abnormality is not generated, and the controller 8 stops the reverse rotation control of the DC electric motor 21 (see FIGS. 4A and 6A). Therefore, the time from when the request to open or close the rear hatch 51 is received to when whether the abnormality is not generated is checked in the reverse rotation control of the DC electric motor 21 to drive the DC electric motor 21 in the rotating direction corresponding to the request can be shortened.

Figure 7:
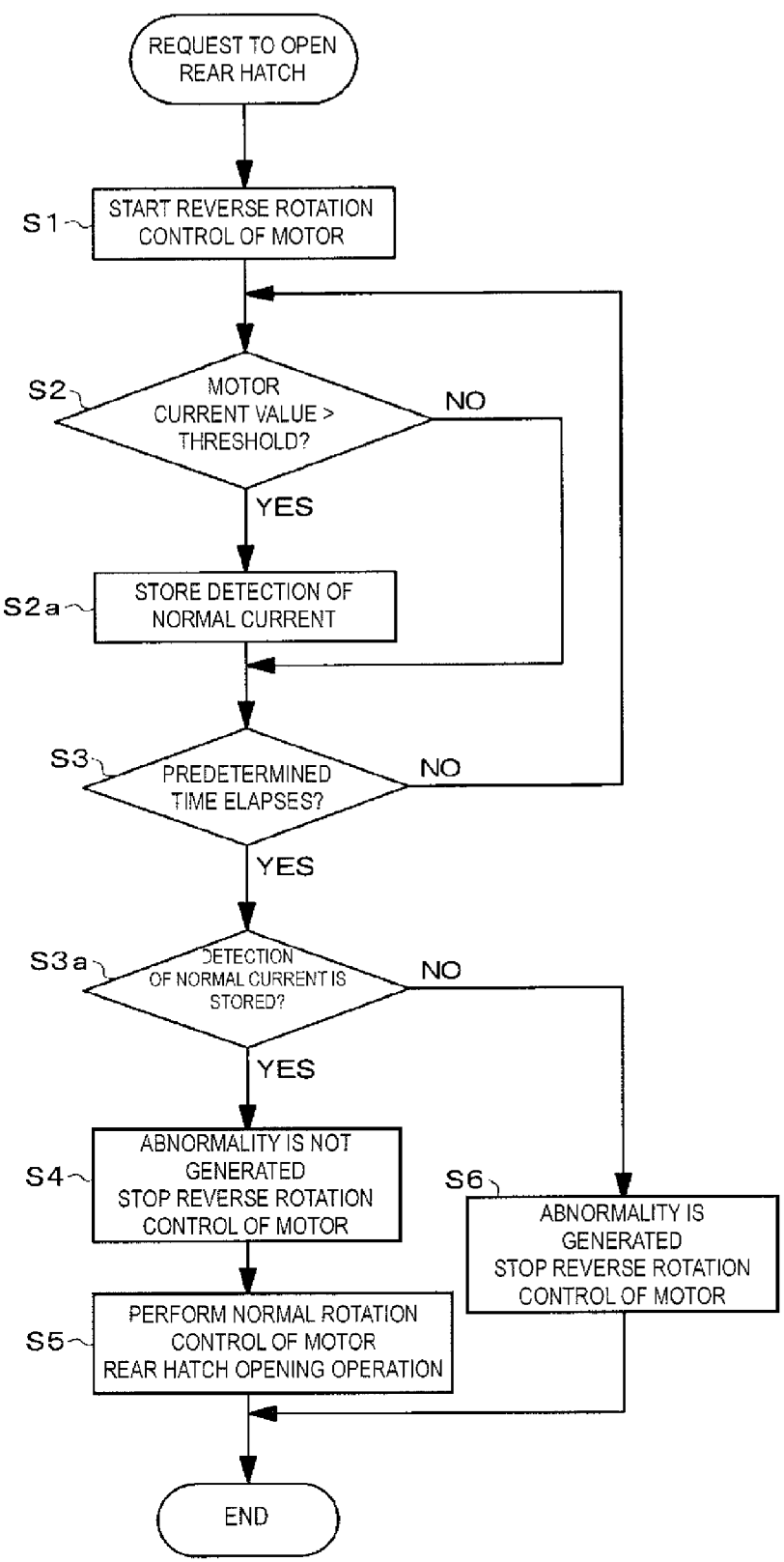
FIG. 7 is a flowchart of the rear hatch opening operation in a second embodiment.
Figure 8:
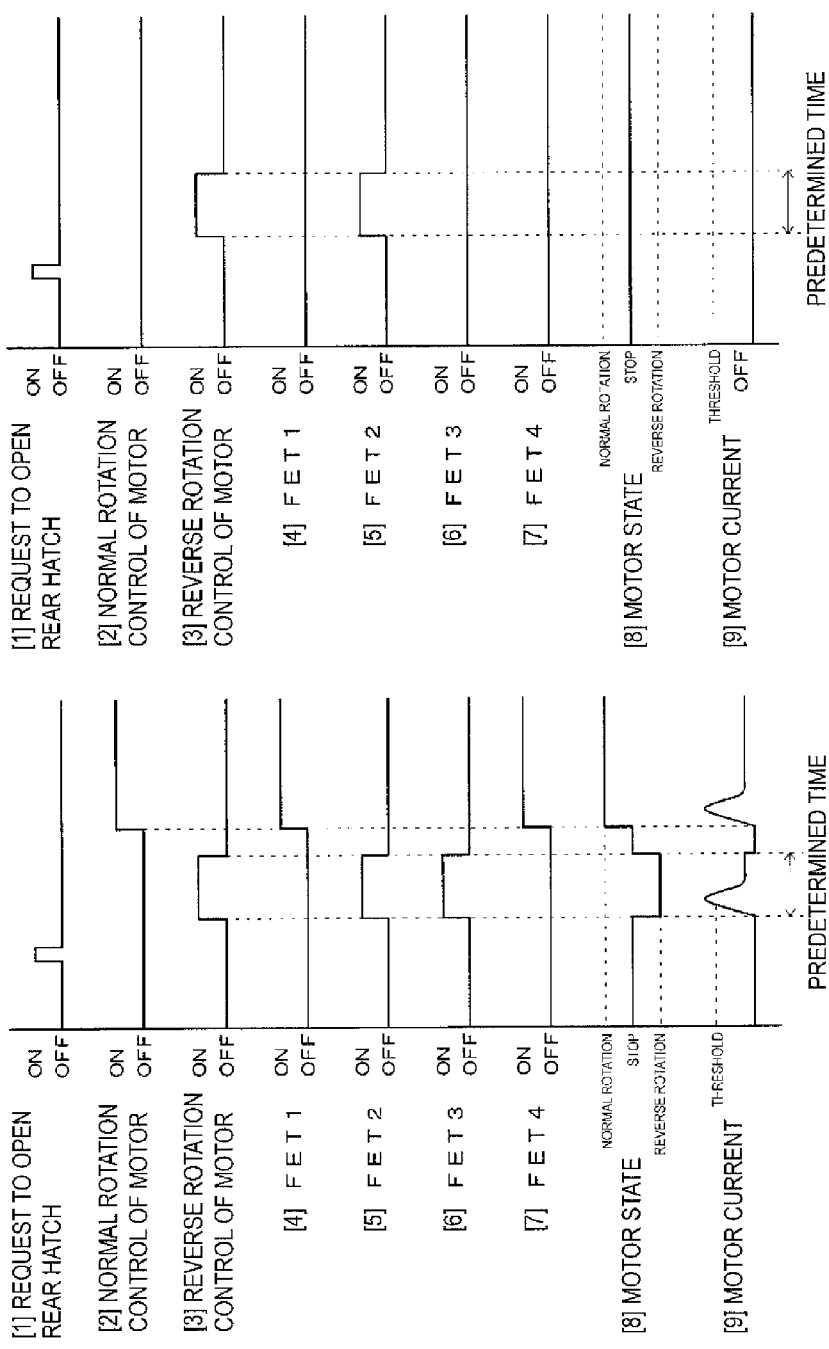
FIGS. 8A and 8B are timing charts of the rear hatch opening operation in the second embodiment.

FIG. 7 is a flowchart illustrating the opening operation of the rear hatch 51 in a second embodiment. FIGS. 8A and 8B are timing charts illustrating the opening operation of the rear hatch 51 in the second embodiment.

When receiving the request to open the rear hatch 51 from other devices 40 (ON of the circled number 1 in FIGS. 8A and 8B), the controller 8 previously starts the reverse rotation control of the DC electric motor 21 using the motor driving circuit 7 (Step S1 in FIG. 7 and ON of the circled number 3 in FIGS. 8A and 8B).

At this point, during the normal state, as illustrated in FIG. 8A, the FETs 1 and 4 of the motor driving circuit 7 are turned off (the circled numbers 4 and 7), and the FETs 2 and 3 are turned on (the circled numbers 5 and 6), whereby the DC electric motor 21 rotates reversely (the circled number 8). The current of the DC electric motor 21 increases (the circled number 9).

The abnormality determination part 8a compares the current of the DC electric motor 21, which is detected by the current detection circuit 15, to a threshold (Step S2 in FIG. 7). When the current of the DC electric motor 21 is less than or equal to the threshold (NO in Step S2), the controller 8 checks whether a predetermined time elapses after starting the reverse rotation control of the DC electric motor 21 (Step S3). When the predetermined time does not elapse (NO in Step S3), the abnormality determination part 8a compares the current of the DC electric motor 21, which is detected by the current detection circuit 15, to the threshold again (Step S2).

When the current of the DC electric motor 21 is greater than the threshold (YES in Step S2 and the circled number 9 in FIG. 8A), the abnormality determination part 8a stores detection of a normal current (a current of the DC electric motor 21 greater than the threshold) in a built-in memory (Step S2a in FIG. 7). Specifically, a current detection flag provided in the built-in memory of the controller 8 is turned on. When the predetermined time does not elapse (NO in Step S3), the abnormality determination part 8a compares the current of the DC electric motor 21 to the threshold again (Step S2).

When the predetermined time elapses (YES in Step S3), the abnormality determination part 8a refers to the built-in memory to check whether the normal current is detected (Step S3a). When the detection of the normal current is stored (YES in Step S3a), the abnormality determination part 8 determines that the abnormality is not generated, and the controller 8 stops the reverse rotation control of the DC electric motor 21 (Step S4 and OFF of the circled number 3 in FIG. 8A). Therefore, as illustrated in FIG. 8A, the FETs 1 to 4 of the motor driving circuit 7 are turned off (the circled numbers 4 to 7), and the DC electric motor 21 stops (the circled number 8).

Then the controller 8 performs the normal rotation control of the DC electric motor 21 using the motor driving circuit 7 to open the rear hatch 51 (Step S5 in FIG. 7). Therefore, as illustrated in FIG. 8A, the FETs 1 and 4 of the motor driving circuit 7 are turned on (the circled numbers 4 and 7), and the FETs 2 and 3 are turned off (the circled numbers 5 and 6), whereby the DC electric motor 21 rotates normally (the circled number 8) to lift the rear hatch 51.

On the other hand, for example, during the abnormal state in which the OFF breakdown is generated in the FET 3 of the motor driving circuit 7, as illustrated in FIG. 8B, even if the controller 8 starts the reverse rotation control of the DC electric motor 21 (the circled number 3), the FET 3 is not tuned on (the circled number 6). Therefore, the DC electric motor 21 remains stopped (the circled number 8), but the current of the DC electric motor 21 does not increase (the circled number 9).

The predetermined time elapses (YES in Step S3) while the current of the DC electric motor 21 is less than or equal to the threshold (NO in Step S2 in FIG. 7), but the detection of the normal current is not stored in the built-in memory of the controller 8 (NO in Step S3a). Therefore, the abnormality determination part 8a determines that the abnormality is generated, and the controller 8 stops the reverse rotation control of the DC electric motor 21 (Step S6 and OFF of the circled number 3 in FIG. 8B). Therefore, the FETs 1 to 4 of the motor driving circuit 7 are turned off (the circled numbers 4 to 7 in FIG. 8B). Then the controller 8 does not perform the normal rotation control of the DC electric motor 21 and not open the rear hatch 51 (go to "END" in FIG. 7).

Figure 9:
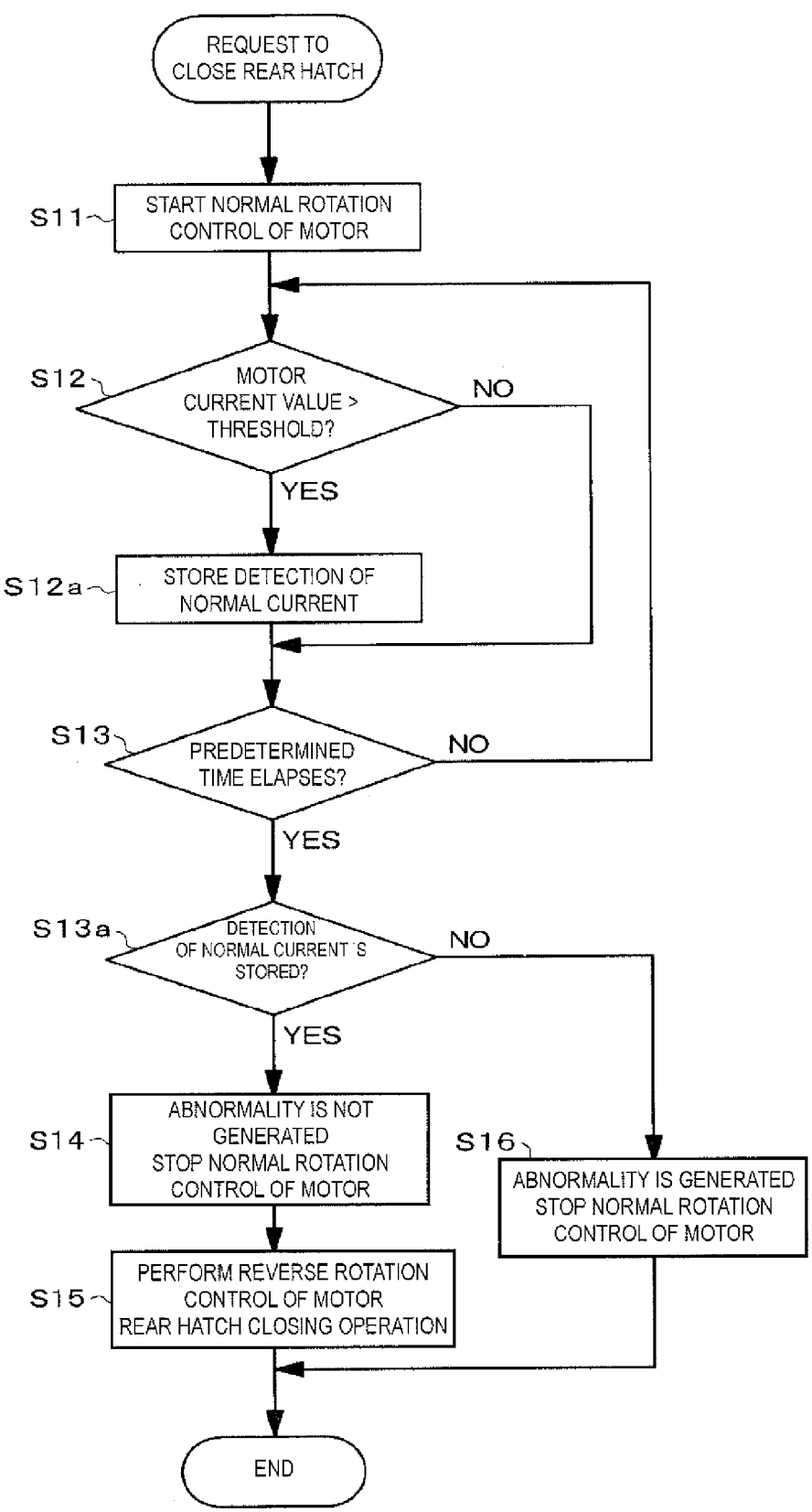
FIG. 9 is a flowchart of the rear hatch closing operation in the second embodiment.
Figure 10:
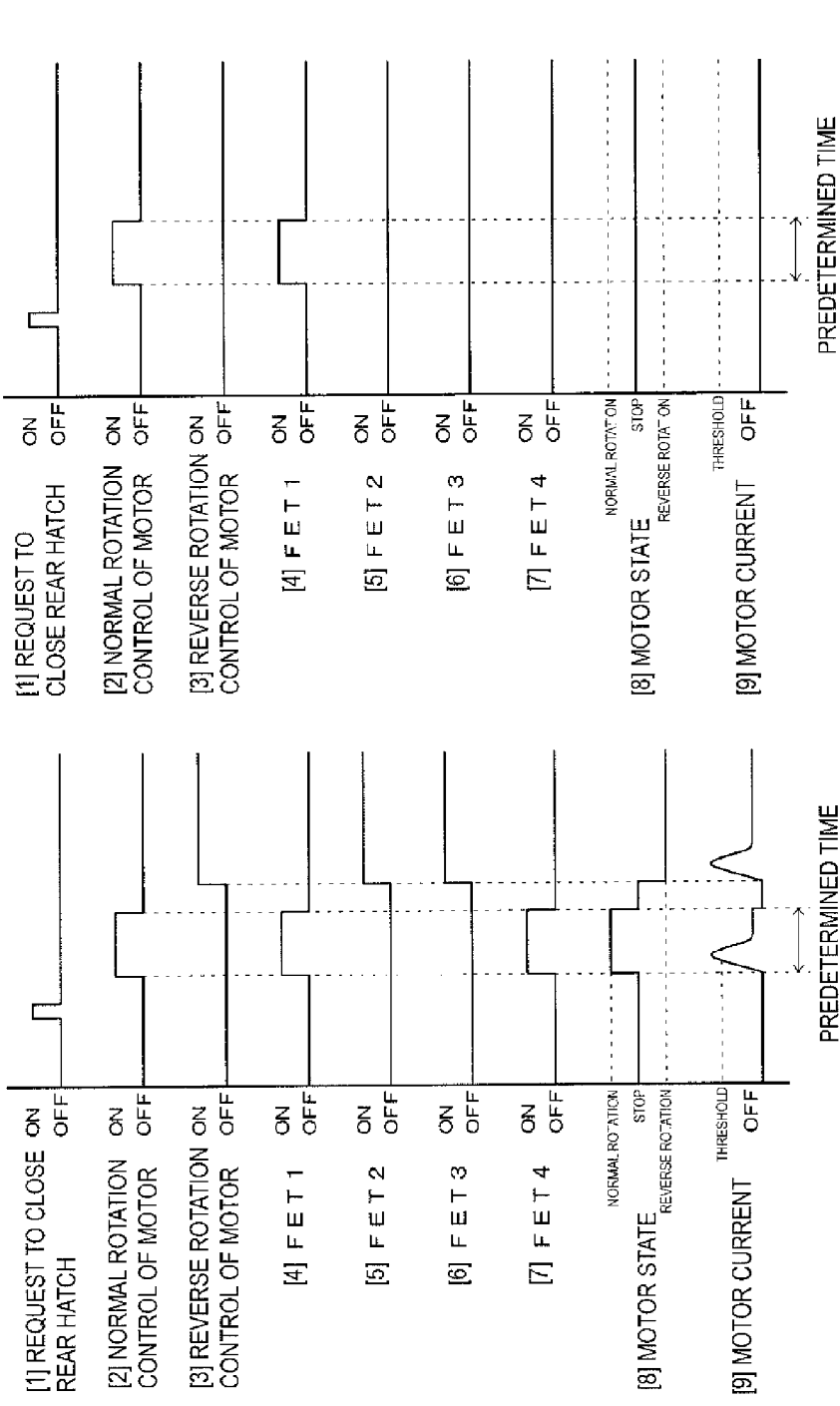
FIGS. 10A and 10B are timing charts of the rear hatch closing operation in the second embodiment.

FIG. 9 is a flowchart illustrating the closing operation of the rear hatch 51 in the second embodiment. FIGS. 10A and 10B are timing charts illustrating the closing operation of the rear hatch 51.

When receiving the request to close the rear hatch 51 from other devices 40 (ON of the circled number 1 in FIGS. 10A and 10B), the controller 8 previously starts the normal rotation control of the DC electric motor 21 using the motor driving circuit 7 (Step S11 in FIG. 9 and ON of the circled number 2 in FIGS. 10A and 10B).

At this point, during the normal state, as illustrated in FIG. 10A, the FETs 1 and 4 of the motor driving circuit 7 are turned on (the circled numbers 4 and 7), and the FETs 2 and 3 are turned off (the circled numbers 5 and 6), whereby the DC electric motor 21 rotates normally (the circled number 8). The current of the DC electric motor 21 increases (the circled number 9).

When the predetermined time does not elapse (NO in Step S13 in FIG. 9), the abnormality determination part 8a compares the current of the DC electric motor 21 to the threshold (Step S12). When the current of the DC electric motor 21 is greater than the threshold until the predetermined time elapses (YES in Step S12), the abnormality determination part 8a stores the detection of the normal current in the built-in memory (Step S12a).

When the predetermined time elapses (YES in Step S13), the abnormality determination part 8a checks whether the detection of the normal current is stored (Step S13a). When the detection of the normal current is stored (YES in Step S13a), the abnormality determination part 8 determines that the abnormality is not generated, and the controller 8 stops the normal rotation control of the DC electric motor 21 (Step S14 and OFF of the circled number 2 in FIG. 10A). Therefore, as illustrated in FIG. 10A, the FETs 1 to 4 of the motor driving circuit 7 are turned off (the circled numbers 4 to 7), and the DC electric motor 21 stops (the circled number 8).

Then the controller 8 performs the reverse rotation control of the DC electric motor 21 using the motor driving circuit 7 to close the rear hatch 51 (Step S15 in FIG. 9). Therefore, as illustrated in FIG. 10A, the FETs 1 and 4 of the motor driving circuit 7 are turned off (the circled numbers 4 and 7), and the FETs 2 and 3 are turned on (the circled numbers 5 and 6), whereby the DC electric motor 21 rotates reversely (the circled number 8) to lower the rear hatch 51.

On the other hand, for example, during the abnormal state in which the OFF breakdown is generated in the FET 4 of the motor driving circuit 7, as illustrated in FIG. 10B, even if the controller 8 starts the normal rotation control of the DC electric motor 21 (the circled number 2), the FET 4 is not tuned on (the circled number 7). Therefore, the DC electric motor 21 remains stopped (the circled number 8), but the current of the DC electric motor 21 does not increase.

The predetermined time elapses (YES in Step S13) while the current of the DC electric motor 21 is less than or equal to the threshold (NO in Step S12 in FIG. 9), but the detection of the normal current is not stored in the built-in memory of the controller 8 (NO in Step S13a). Therefore, the abnormality determination part 8a determines that the abnormality is generated, and the controller 8 stops the normal rotation control of the DC electric motor 21 (Step S16 and OFF of the circled number 2 in FIG. 10B). Therefore, the FETs 1 to 4 of the motor driving circuit 7 are turned off (the circled numbers 4 to 7 in FIG. 10B). Then the controller 8 does not perform the reverse rotation control of the DC electric motor 21 and not close the rear hatch 51 (go to "END" in FIG. 9).

According to the second embodiment, when the current of the DC electric motor 21 is greater than the threshold while the reverse rotation control of the DC electric motor 21 is performed during the previous predetermined time, the abnormality determination part 8a determines that the abnormality is not generated after the predetermined time elapses, and the controller 8 stops the reverse rotation control of the DC electric motor 21. Therefore, the time from when the request to open or close the rear hatch 51 is received to when whether the abnormality is not generated is checked in the reverse rotation control of the DC electric motor 21 to drive the DC electric motor 21 in the rotating direction corresponding to the request can be shortened by setting the short predetermined time.

Figure 11:
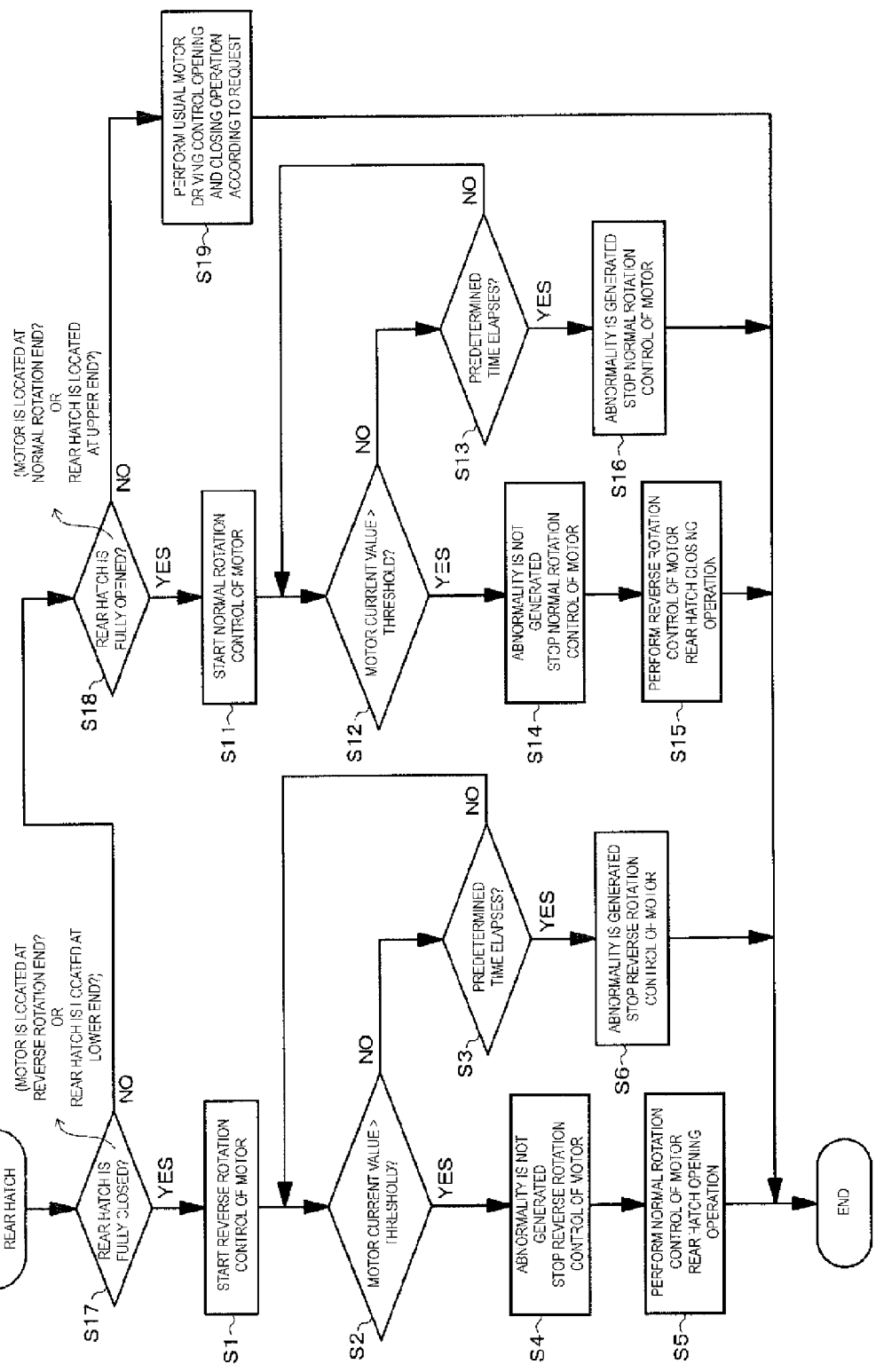
FIG. 11 is a flowchart of a rear hatch opening and closing operation in a third embodiment.

FIG. 11 is a flowchart illustrating the opening and closing operation of the rear hatch 51 in a third embodiment.

When receiving the request to open and close the rear hatch 51, the controller 8 determines whether the rear hatch 51 is currently in a fully-closed state (Step S17). At this point, for example, the controller 8 determines that the rear hatch 51 is in the fully-closed state (YES in Step S17) when detecting that the DC electric motor 21 is located at an angle of a reverse rotation end based on the detection value (the rotation angle of the DC electric motor 21) of the rotation detector 8c. Alternatively, the controller 8 determines that the rear hatch 51 is in the fully-closed state (YES in Step S17) when detecting that the rear hatch 51 is located at a lower end based on the detection value (the opening and closing position of the rear hatch 51) of the position detector 8b.

When the rear hatch 51 is currently in the fully-closed state, the controller 8 starts the reverse rotation control of the DC electric motor 21 (Step S1). When the current of the DC electric motor 21 is greater than the predetermined threshold (YES in Step S2) until the predetermined time elapses (NO in Step S3), the abnormality determination part 8a determines that the abnormality is not generated, and the controller 8 stops the reverse rotation control of the DC electric motor 21 (Step S4). Then the controller 8 performs the normal rotation control of the DC electric motor 21 to open the rear hatch 51 (Step S5).

When the predetermined time elapses (YES in Step S3) while the current of the DC electric motor 21 is less than or equal to the threshold since the reverse rotation control of the DC electric motor 21 is started (NO in Step S2), the abnormality determination part 8a determines that the abnormality is generated, and the controller 8 stops the reverse rotation control of the DC electric motor 21 (Step S6). In this case, the controller 8 does not perform the normal rotation control of the DC electric motor 21 and not open the rear hatch 51.

On the other hand, for example, the controller 8 determines that the rear hatch 51 is not in the fully-closed state when detecting that the DC electric motor 21 is not located at the angle of the reverse rotation end (NO in Step S17). Alternatively, the controller 8 determines that the rear hatch 51 is not in the fully-closed state when detecting that the rear hatch 51 is not located at the lower end (NO in Step S17).

Then the controller 8 determines whether the rear hatch 51 is currently in a fully-opened state (Step S18). At this point, for example, the controller 8 determines that the rear hatch 51 is in the fully-opened state (YES in Step S18) when detecting that the DC electric motor 21 is located at an angle of a normal rotation end based on the detection value of the rotation detector 8c. Alternatively, the controller 8 determines that the rear hatch 51 is in the fully-opened state when detecting that the rear hatch 51 is located at an upper end based on the detection value of the position detector 8b (YES in Step S18).

When the rear hatch 51 is currently in the fully-opened state, the controller 8 starts the normal rotation control of the DC electric motor 21 (Step S11). When the current of the DC electric motor 21 is greater than the threshold (YES in Step S12) until the predetermined time elapses (NO in Step S13), the abnormality determination part 8*a* determines that the abnormality is not generated, and the controller 8 stops the normal rotation control of the DC electric motor 21 (Step S14). Then the controller 8 performs the reverse rotation control of the DC electric motor 21 to close the rear hatch 51 (Step S15).

When the predetermined time elapses (YES in Step S13) while the current of the DC electric motor 21 is less than or equal to the threshold since the normal rotation control of the DC electric motor 21 is started (NO in Step S12), the abnormality determination part 8*a* determines that the abnormality is generated, and the controller 8 stops the normal rotation control of the DC electric motor 21 (Step S16). In this case, the controller 8 does not perform the reverse rotation control of the DC electric motor 21 and not close the rear hatch 51.

In the case that the rear hatch 51 is in neither the fully-closed state nor the fully-opened state when the request to open and close the rear hatch 51 is received (NO in Step S17 and NO in Step S18), usual rear hatch opening and closing processing is performed (Step S19). That is, the DC electric motor 21 is driven in response to the opening and closing request without performing the reverse rotation control of the DC electric motor 21 and the abnormal determination during the previous predetermined time, and rear hatch 51 is opened and closed.

Figure 12:
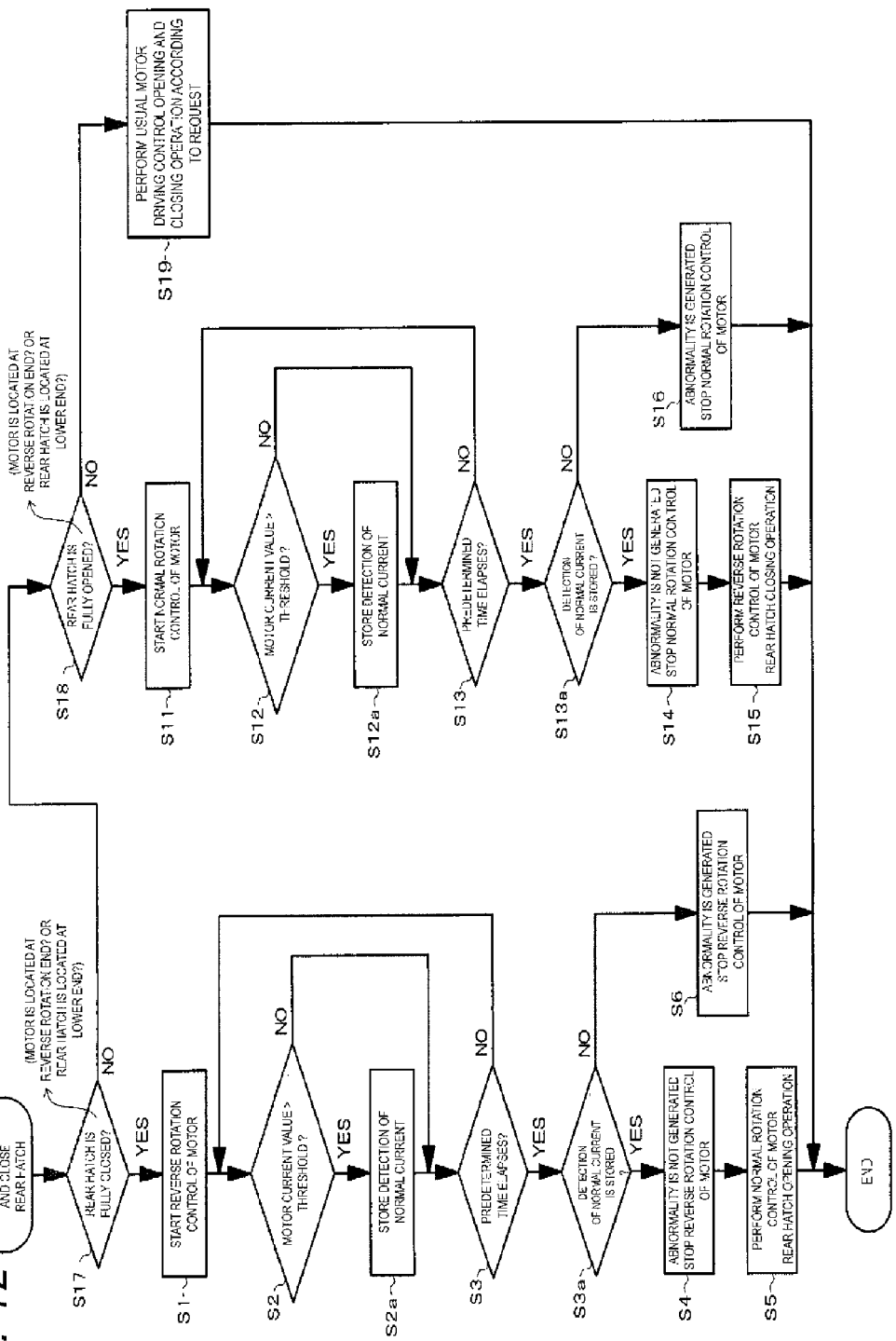
FIG. 12 is a flowchart of the rear hatch opening and closing operation in the third embodiment.

FIG. 12 is a flowchart illustrating the opening and closing operation of the rear hatch 51 in a fourth embodiment.

When receiving the request to open and close the rear hatch 51, the controller 8 determines whether the rear hatch 51 is currently in the fully-closed state (Step S17). When the rear hatch 51 is in the fully-closed state (YES in Step S17), the controller 8 starts the reverse rotation control of the DC electric motor 21 (Step S1). The abnormality determination part 8*a* compares the current of the DC electric motor 21 to the threshold (Step S2) until the predetermined time elapses (NO in Step S3). When the current of the DC electric motor 21 is greater than the threshold until the predetermined time elapses (YES in Step S2), the abnormality determination part 8*a* stores the detection of the normal current in the built-in memory (Step S2*a*).

When the predetermined time elapses (YES in Step S3), the abnormality determination part 8*a* checks whether the detection of the normal current is stored (Step S3*a*). When the detection of the normal current is stored (YES in Step S3*a*), the abnormality determination part 8*a* determines that the abnormality is not generated, and the controller 8 stops the reverse rotation control of the DC electric motor 21 (Step S4). Then the controller 8 performs the normal rotation control of the DC electric motor 21 to open the rear hatch 51 (Step S5).

When the predetermined time elapses (YES in Step S3) while the current of the DC electric motor 21 is less than or equal to the threshold since the reverse rotation control of the DC electric motor 21 is started (NO in Step S2), the detection of the normal current is not stored in the built-in memory of the controller 8 (NO in Step S3*a*). Therefore, the abnormality determination part 8*a* determines that the abnormality is generated, and the controller 8 stops the reverse rotation control of the DC electric motor 21 (Step S6). In this case, the controller 8 does not perform the normal rotation control of the DC electric motor 21 and not open the rear hatch 51.

On the other hand, when determining that the rear hatch 51 is not in the fully-closed state (NO in Step S17), the controller 8 determines whether the rear hatch 51 is currently in the fully-opened state (Step S18). When the rear hatch 51 is currently in the fully-opened state (YES in Step S18), the controller 8 starts the normal rotation control of the DC electric motor 21 (Step S11).

The abnormality determination part 8*a* compares the current of the DC electric motor 21 to the threshold (Step S12) until the predetermined time elapses (NO in Step S13). When the current of the DC electric motor 21 is greater than the threshold until the predetermined time elapses (YES in Step S12), the abnormality determination part 8*a* stores the detection of the normal current in the built-in memory (Step S12*a*).

When the predetermined time elapses (YES in Step S13), the abnormality determination part 8*a* checks whether the detection of the normal current is stored (Step S13*a*). When the detection of the normal current is stored (YES in Step S13*a*), the abnormality determination part 8*a* determines that the abnormality is not generated, and the controller 8 stops the normal rotation control of the DC electric motor 21 (Step S14). Then the controller 8 performs the reverse rotation control of the DC electric motor 21 to close the rear hatch 51 (Step S15).

When the predetermined time elapses (YES in Step S13) while the current of the DC electric motor 21 is less than or equal to the threshold since the reverse rotation control of the DC electric motor 21 is started (NO in Step S12), the detection of the normal current is not stored in the built-in memory of the controller 8 (NO in Step S13*a*). Therefore, the abnormality determination part 8*a* determines that the abnormality is generated, and the controller 8 stops the normal rotation control of the DC electric motor 21 (Step S16). In this case, the controller 8 does not perform the reverse rotation control of the DC electric motor 21 and not close the rear hatch 51.

In the case that the rear hatch 51 is in neither the fully-closed state nor the fully-opened state when the request to open and close the rear hatch 51 is received (NO in Step S17 and NO in Step S18), usual rear hatch opening and closing processing is performed (Step S19).

According to the third and fourth embodiments (FIGS. 11 and 12), in the case that the rear hatch 51 is in the fully-closed state and the fully-opened state, namely, in the case that the DC electric motor 21 is located at the positions of the normal rotation end and the reverse rotation end or in the case that the rear hatch 51 is located at the positions of the upper end and the lower end, the DC electric motor 21 is previously driven in the opposite rotating direction to the intended direction only for the predetermined time, and whether the abnormality is generated is determined. The DC electric motor 21 is driven in the intended rotating direction when the abnormality is not generated, but the DC electric motor 21 is not driven in the intended rotating direction when the abnormality is generated. Therefore, the drive in the abnormal state in which the DC electric motor 21 is not reversely rotated can be prevented.

For example, even in the case that a person or an object is caught in the rear hatch 51 when the DC electric motor 21 is reversely rotated to close the rear hatch 51, the DC electric motor 21 can securely be inverted (normally rotated), and quickly switch the rear hatch 51 to the opening operation. For example, even in the case that the rear hatch 51 falls freely due to the breakdown when the DC electric motor 21 is normally rotated to open the rear hatch 51, the DC electric motor 21 can securely be inverted (reversely rotated), and slowly close the rear hatch 51 against a gravitational force.

In addition to the above embodiments, various embodiments can be made in the present invention. In the first to fourth embodiments, by way of example, the drive of the DC electric motor 21 is controlled using the motor driving circuit 7 including the H-bridge circuit of the four FETs 1 to 4 and the drive circuit 6 (FIG. 1). However, the present invention is not limited to the first to fourth embodiments. Alternatively, for example, as illustrated in FIG. 13, the drive of the DC electric motor 21 may be controlled using a motor driving circuit 7' including two relays 16 and 17, two relay driving circuits 18 and 19, and one FET 5.

Figure 13:
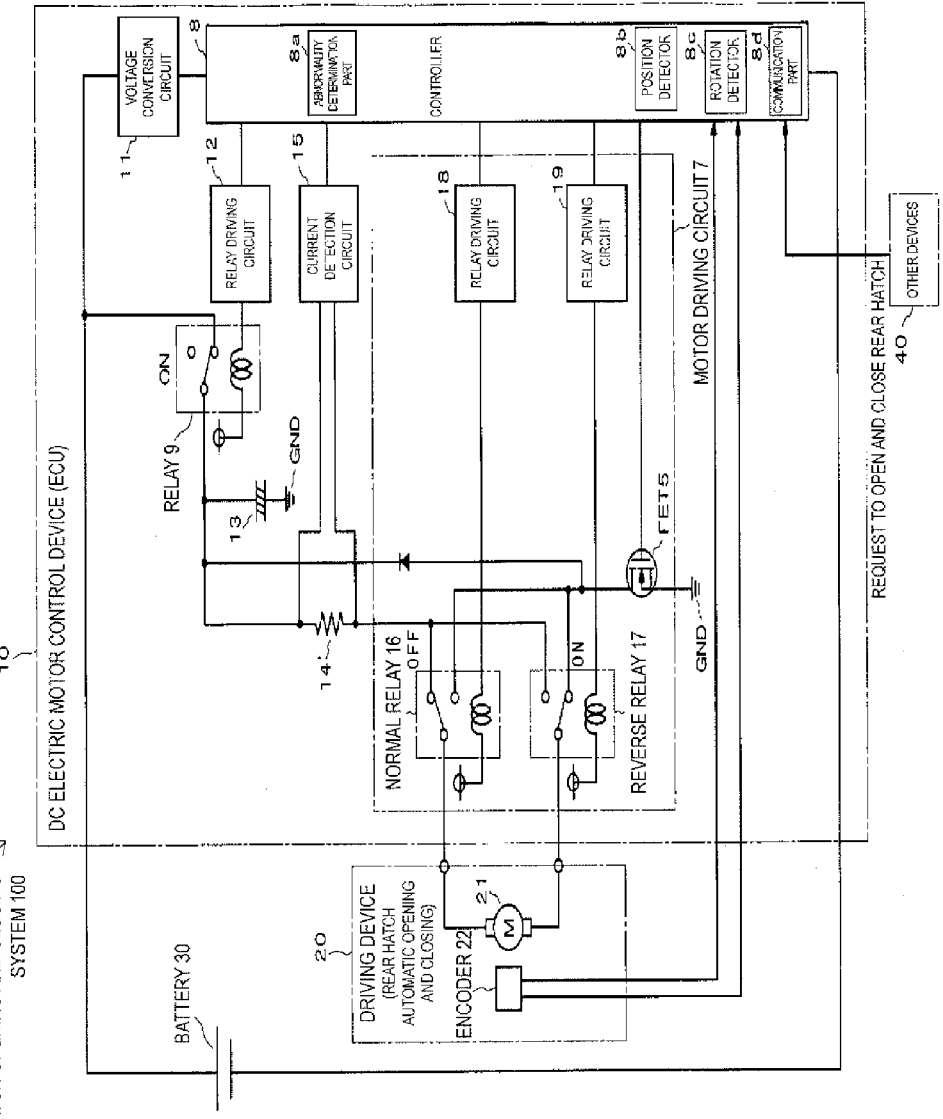
FIG. 13 is a configuration diagram illustrating another example of the DC electric motor control device.

In an embodiment in FIG. 13, the controller 8 turns on the relay 9 using the relay driving circuit 12, turns on the FET 5, turns off the normal relay 16 using relay driving circuit 18, and turns on the reverse relay 17 using the relay driving circuit 19, whereby the current is passed through the DC electric motor 21 in a positive direction to normally rotate the DC electric motor 21. The controller 8 turns on the relay 9 and the FET 5, turns on the normal relay 16 using the relay driving circuit 18, and turns off the reverse relay 17 using the relay driving circuit 19, whereby the current is passed through the DC electric motor 21 in the inverted direction to reversely rotate the DC electric motor 21. The current detection circuit 15 detects the current passed through the DC electric motor 21 by the voltage drop at both ends of the resistor 14' provided between the relays 9 and 16.

In the above embodiments, by way of example, the FETs 1 to 5 and the relays 16 and 17 are used as the plural switching elements constituting the motor driving circuits 7 and 7'. However, the present invention is not limited to the above embodiments. Alternatively, for example, other switching elements, such as a MOSFET (Metal Oxide Semiconductor Field Effect Transistor), a power transistor, and a thyristor, may be used.

In the above embodiments, by way of example, the reverse rotation control and the abnormal determination of the DC electric motor 21 are previously performed within the predetermined time when the signal indicating the request to open and close the rear hatch 51 is received from other devices 40. However, the present invention is not limited to the above embodiments. Alternatively, for example, the reverse rotation control and the abnormal determination of the DC electric motor 21 may previously be performed within the predetermined time, when the DC electric motor 21 rotates to the position of the normal rotation end or the reverse rotation end or when the rear hatch 51 moves to the position of the upper end or the lower end. Alternatively, the reverse rotation control and the abnormal determination of the DC electric motor 21 may previously be performed with a predetermined period, when the DC electric motor 21 is located at the position of the normal rotation end or the reverse rotation end or when the rear hatch 51 is located at the position of the upper end or the lower end.

In the above embodiments, by way of example, the abnormality is determined by comparing the current passed through the DC electric motor 21 to the threshold during the previous reverse rotation control of the DC electric motor 21 within the predetermined time. However, the present invention is not limited to the above embodiments. Alternatively, for example, the reverse rotation state of the DC electric motor 21 may be detected based on the rotation angle or the number of revolutions of the DC electric motor 21, which is detected by the rotation detector 8c, and the abnormality may be determined based on the detection result.

In the above embodiments, by way of example, the DC electric motor 21 rotates reversely by the reverse rotation control previously performed by the controller 8 within the predetermined time. However, the present invention is not limited to the above embodiments. Alternatively, for example, the DC electric motor 21 may not rotate although a voltage is applied to the DC electric motor 21 by the reverse rotation control previously performed by the controller 8.

Above, by way of example, one or more embodiments of the present invention is applied to the DC electric motor control device (ECU) 10, which controls the DC electric motor 21 used in the electrically-operated rear hatch opening and closing system 100. One or more embodiments of the present invention can also be applied to a control device that controls the drive of the DC electric motor used in other purposes.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A DC electric motor control device comprising:
   a motor driving circuit that is constructed by a plurality of switching elements;
   a controller that operates the motor driving circuit to control a normal rotation and a reverse rotation of a DC electric motor; and
   an abnormality determination part that determines whether an abnormality is generated while the controller controls the DC electric motor,
   wherein, when performing the normal rotation control of the DC electric motor, the controller initially performs reverse rotation control of the DC electric motor for a predetermined time using the motor driving circuit, and the controller performs the normal rotation control only when the abnormality determination part determines that the abnormality is not generated during the reverse rotation control, and
   wherein, when performing the reverse rotation control of the DC electric motor, the controller initially performs the normal rotation control of the DC electric motor for a predetermined time using the motor driving circuit and the controller performs the reverse rotation control only when the abnormality determination part determines that the abnormality is not generated during the normal rotation control.

2. The DC electric motor control device according to claim 1, further comprising:
   a rotation angle detector that detects a rotation angle of the DC electric motor,
   wherein the controller performs the normal rotation control or the reverse rotation control of the DC electric motor in a range of a predetermined rotation angle based on a detection value of the rotation angle detector, and
   wherein the controller initially performs the control of the DC electric motor for the predetermined time and the abnormality determination of the abnormality determination part when the DC electric motor is located at an angle of a normal rotation end or a reverse rotation end.

3. The DC electric motor control device according to claim 2, further comprising:
   a current detector that detects a current passed through the DC electric motor,
   wherein the abnormality determination part determines whether the abnormality is generated based on the current detected by the current detector.

4. The DC electric motor control device according to claim 1, further comprising:
   a position detector that detects a position of an object vertically moved by power of the DC electric motor, wherein the controller performs the normal rotation control or the reverse rotation control to lift or lower the object in a predetermined range based on a detection value of the position detector, and wherein the controller initially performs the control of the DC electric motor for the predetermined time and the abnormality determination of the abnormality determination part when the object is located at an upper end.

5. The DC electric motor control device according to claim 4, further comprising:

a current detector that detects a current passed through the DC electric motor, wherein the abnormality determination part determines whether the abnormality is generated based on the current detected by the current detector.

6. The DC electric motor control device according to claim 1, further comprising:

a position detector that detects a position of an object vertically moved by power of the DC electric motor, wherein the controller performs the normal rotation control or the reverse rotation control to lift or lower the object in a predetermined range based on a detection value of the position detector, and wherein the controller initially performs the control of the DC electric motor for the predetermined time and the abnormality determination of the abnormality determination part when the object is located at a lower end.

7. The DC electric motor control device according to claim 6, further comprising:

a current detector that detects a current passed through the DC electric motor, wherein the abnormality determination part determines whether the abnormality is generated based on the current detected by the current detector.

8. The DC electric motor control device according to claim 1, further comprising:

a current detector that detects a current passed through the DC electric motor, wherein the abnormality determination part determines whether the abnormality is generated based on the current detected by the current detector.

9. The DC electric motor control device according to claim 8, wherein, when the current detected by the current detector is greater than a threshold while the DC electric motor is initially controlled for the predetermined time:

the abnormality determination part determines that the abnormality is not generated, and the controller stops the control of the DC electric motor.

10. The DC electric motor control device according to claim 8, wherein, when the current detected by the current detector is greater than a threshold while the DC electric motor is initially controlled for the predetermined time:

the abnormality determination part determines that the abnormality is not generated after the predetermined time elapses, and the controller stops the control of the DC electric motor.

11. A DC electric motor control device comprising:

a motor driving circuit that is constructed by a plurality of switching elements;

a controller that operates the motor driving circuit to control a normal rotation and a reverse rotation of a DC electric motor for opening and closing a rear hatch of a vehicle; and an abnormality determination part that determines whether an abnormality is generated while the controller controls the DC electric motor, wherein, when performing reverse rotation control of the DC electric motor, the controller initially performs normal rotation control of the DC electric motor for a predetermined time using the motor driving circuit such that the DC electric motor rotates in a direction to open the rear hatch to close the rear hatch while the rear hatch is in a fully-opened state, and the controller performs the reverse rotation control to close the rear hatch only when the abnormality determination part determines that the abnormality is not generated during the normal rotation control.

\* \* \* \* \*